United States Patent [19]
Green et al.

[11] 3,975,748
[45] Aug. 17, 1976

[54] MULTISPECTRAL LASER CAMERA DEVICE

[75] Inventors: Dale Green; Duane Erway, both of Sierra Madre, Calif.; Robert Condon, Olney, Md.; William C. Schoonover, Xenia; Norman L. Rowe, Springfield, both of Ohio

[73] Assignee: The United States of America as represented by the Secretary of the Air Force, Washington, D.C.

[22] Filed: May 22, 1970

[21] Appl. No.: 48,613

[52] U.S. Cl. .............................. 358/78; 178/6.7 A; 316/33 A
[51] Int. Cl.² ...................... H04N 5/86; G01T 1/16
[58] Field of Search ...................... 178/6.7 A, 6.7 R; 346/33 A; 358/78

[56] References Cited
UNITED STATES PATENTS

| | | |
|---|---|---|
| 3,019,292 | 1/1962 | John .................................. 178/6.7 R |
| 3,493,754 | 2/1970 | Black ................................ 178/6.7 R |
| 3,534,166 | 10/1970 | Korpel .............................. 178/6.7 A |
| 3,558,812 | 1/1971 | Beckmann ........................ 178/6.7 R |
| 3,600,507 | 8/1971 | Newgard ........................... 178/6.7 A |

*Primary Examiner*—Nelson Moskowitz
*Attorney, Agent, or Firm*—Joseph E. Rusz; Jacob N. Erlich

[57] ABSTRACT

A multispectral laser camera made up of a plurality of energy producing means which scan a target area. The resultant reflected light off the target produces a true color image of the target after being processed through a series of photomultiplier tubes, amplifiers and modulators. By selectively varying the connections between the above elements a false color image of the scanned target may also be produced. This false color image overcomes the difficulties in detecting camouflaged targets.

1 Claim, 2 Drawing Figures

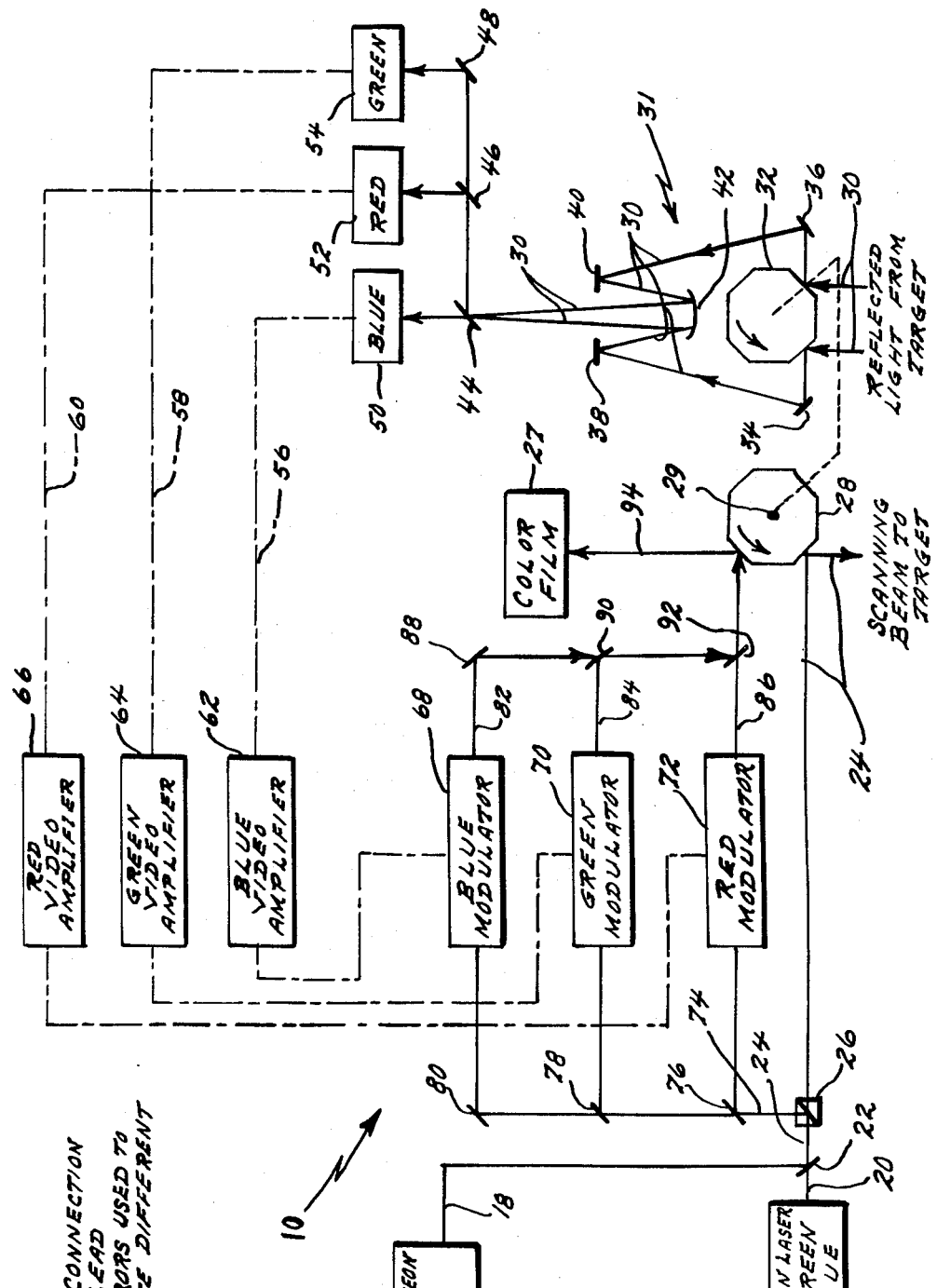

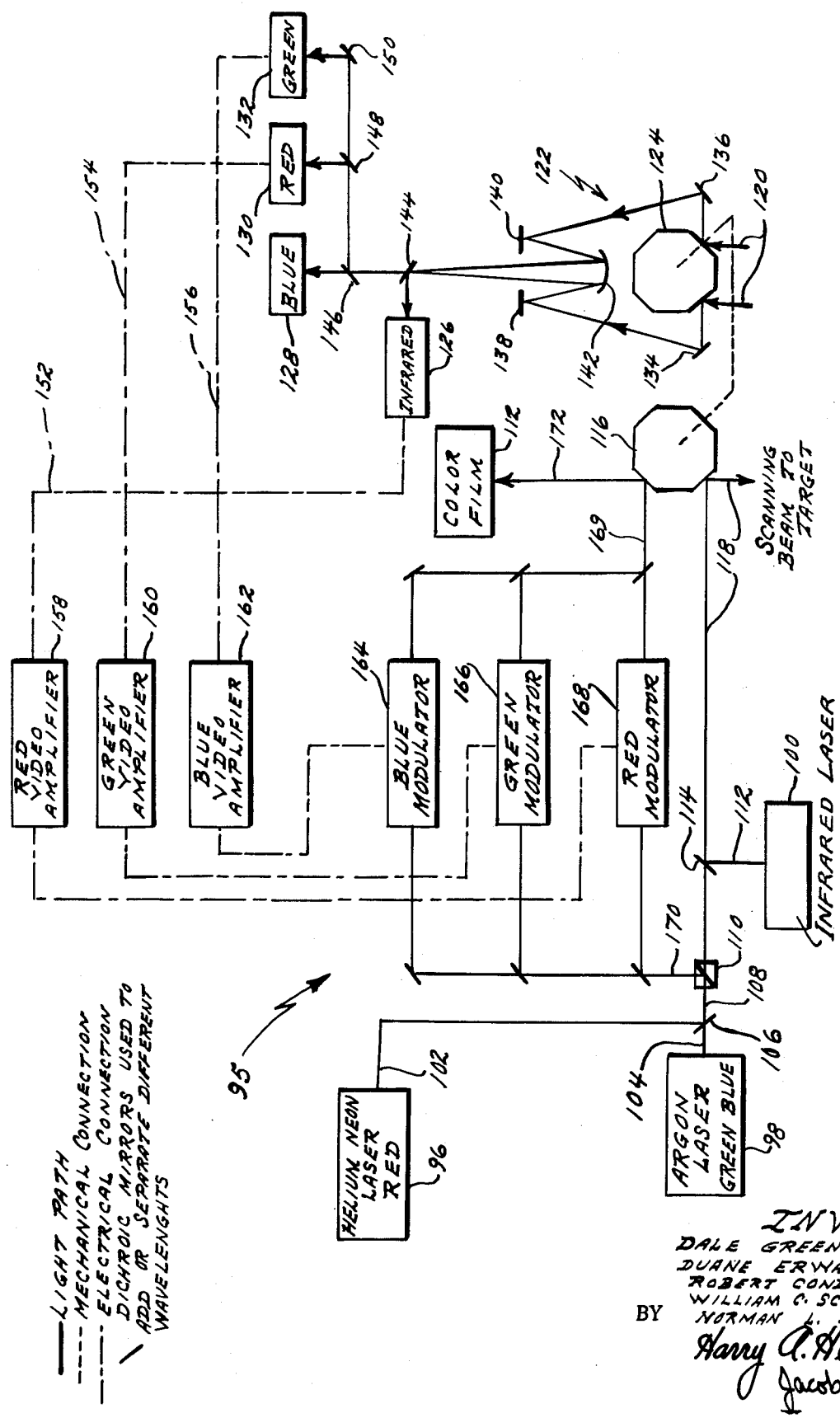

MULTISPECTRAL LASER CAMERA DEVICE

BACKGROUND OF THE INVENTION

This invention relates generally to a photographic system of the scanning type in which the parts of the subject being photographed are illuminated by a moving radiant energy beam, and more particularly to the utilization of multi-spectral color and "false color" photography in such a photographic system.

This invention is an improvement over U.S. Pat. No. 3,316,348 issued Apr. 25, 1967. In the area of tactical reconnaissance, there is an urgent need for sensor techniques which are suitable for detection and identification of targets of military significance such as enemy personnel, tanks, trucks, missile launch sites, stores, etc. Because a large part of emeny activity occurs at night, airborne sensors nighttime operation are increasingly important. As shown in U.S. Pat. No. 3,316,348 it has been possible to make a photographic recording of a large dark object, such as a long strip of terrain as viewed from an airplane at night, by means of an extremely narrow radiant energy beam (such as produced by a laser) which beam is caused to line scan the object, for example, in a rectilinear pattern. By causing the scan movement of the illuminating laser light beam and the scanning of the photographic film by a second light source to be synchronous, the photographic record will accurately reproduce the subject by a photograph. The problem arising in U.S. Pat. No. 3,316,348 and in other prior art devices is that single color line scan is utilized in obtaining this photographic information. The result is imagery where targets of interest are distinguished and identified only if sufficient contrast and resolution are available and are depicted as one shade of gray against the background of another shade of gray. The single color line scan also falls short wherever it is necessary to make rapid recognition and detection of camouflaged areas in which these gray areas are virtually indistinguishable.

SUMMARY OF THE INVENTION

The instant invention overcomes all the problems heretofore encountered and as set forth hereinabove.

The laser line scan sensor is a reconnaissance sensor which is designed to make a photographic recording of a long strip of terrain from an airplane at night. This is accomplished by using an extremely narrow beam of laser energy to illuminate the terrain and an optical receiver system to focus the reflected light onto a photo multiplier tube. Laser energy is scanned quickly along a path perpendicular to the motion of the plane which together with the motion of the plane results in a rectilinear scan pattern. The electrical signal produced by the photomultiplier tube is proportional to the reflectivity of each of the elemental areas sequentially illuminated by the scanning laser beam. This signal is used to modulate the intensity of a light beam which is scanning a photographic film. When the movement and position of the light beam scanning the film and the light beam scanning the terrain are synchronized and when the photographic film is moved in synchronism with movement of the airplane, the result is an accurate photograph of the strip over which the airplane flew.

This invention utilizes a multi-color or a multispectral laser line scan device. The scanning beam that illuminates the terrain or target area is produced by several different lasers. The output from each laser, each of which is a different color or wavelength, is combined into a single scanning beam of light. The optical receiver contains an optical system for separating the reflected energy for each wavelength in the scanning beam, and directing it to separate photomultiplier tubes. This results in several independent electrical signals each of which represents the reflectivity of the scan terrain at a particular wavelength. In a red, green, and blue three-color system, there are three video signals representing the reflectivity of the target at the red, green, and blue wavelengths in the scanning beams. As in the single color system, the multispectral line scanning device includes a synchronous film recording system. The line beam which scans the photographic film contains a red component, a green component, and a blue component. Separate optical modulators independently control the intensity of each of the three colors.

When the red, green and blue electrical signals control the red, green, and blue modulators, respectively the multispectral line scan device of this invention produces a nearly normal three color photograph of the target area.

It should be understood, however, that the electrical video signals from any particular transmitted wavelength do not have to be connected to a particular recording modulator. The red video signal, for example, does not have to be connected to the red modulator (which controls the red component in the film lighting beam). By connecting the infrared video signal to the red modulator, the red video to the green modulator and the green video signal to the blue modulator a wavelength transposition which produces an interesting color photograph occurs. This wavelength transposition overcomes the difficulties encountered when photographing camouflaged areas. The photograph produced in the wavelength transposition produces a photograph of false colors and therefore can easily detect a camouflaged target.

It is therefore an object of this invention to provide a multispectral laser camera device for photographing extended dark objects or scenes with a multiple wavelength laser beam to obtain a nearly true color image of the object photographed.

It is a further object of this invention to provide a multispectral laser camera device which phototgraphs extended dark objects or scenes with a multiple wavelength laser beam to obtain a false color image of the object or scene.

It is another object of this invention to provide a multispectral laser camera device which utilizes conventional, currently available components that lend themselves to standard mass producing manufacturing techniques.

For a better understanding of the present invention, together with other and further objects therefore, reference is made to the following description taken in connection with the accompanying drawing and its scope will be pointed out in the appended claims.

DESCRIPTION OF THE DRAWINGS

FIG. 1 is a schematic diagram of the multispectral laser camera device of this invention set up to produce a true three color photograph; and FIG. 2 is a schematic diagram of the multispectral laser camera device of this invention with wavelength transposition to produce a false three color photograph.

DESCRIPTION OF THE PREFERRED EMBODIMENTS

Reference is now made to FIG. 1 which represents a schematic diagram of the multispectral laser camera 10 of this invention set up to produce a true three color photograph of a target. A multiple wavelength laser beam is utilized in this invention and this laser beam is preferably in the spectral region of red, green and blue. However, the transmitted wavelengths can be selected anywhere between or within the far infrared and the ultra-violet portion of the spectrum where laser energy can be generated.

The radiant energy source in this invention is a plurality of lasers 14 and 16. A helium neon laser 14 emits radiant energy 18 in the red spectrum while an argon laser 16 emits energy 20 in the green and blue spectrum. A dichroic mirror 22 adds the wavelengths in order to produce the multiple wavelength laser beam 24. Beam 24 is utilized to (1) scan an appropriate target, and (2) be redirected by beam splitter 26 to scan across the photographic color film 27 in a manner which will be described in detail hereinbelow.

Multiple wavelength 24 is directed against a mirror scanner 28 which in the instant invention takes the form of a rotating octagon. The scanner 28 is rotatably mounted about its axis 29 and is driven by any suitable drive means (not shown). Rotation of this scanner 28 causes the multiple wavelength laser beam 24 to be scanned in the vertical plane perpendicular to the plane of the paper so as to cause successive illumination of a strip of the terrain below, which is at the intersection of the vertical plane and the ground. The reflected beams of light 30 from the target below are redirected to an optical receiving means 31. The optical receiving means 31 is made up of a scanner mirror 32 and a plurality of other reflecting surfaces separate the reflected energy for each wavelength in the scanning beam and direct it to separate photomultiplier tubes, 50, 52 and 54. The scanner mirror 32 also takes the form of a rotating octagon and is mechanically linked and synchronous with the first scanner mirror 28. The reflected light beams 30 are redirected from the scanner mirror 32 to a plurality of mirrors 34, 36, 38 and 40.

Mirror 34 is located on one side of scanner mirror 32 while another mirror 36 is located on the side thereof. The reflected light beam 30 is directed off each of the mirrors 34 and 36, respectively, onto a pair of mirrors 38 and 40 and from there onto a concave reflecting surface 42.

As the multiple wavelength beam of light leaves the concave reflecting surface 42 it is directed to a plurality of dichroic mirrors 44, 46 and 48 which separate the different wavelengths of light before directing it to the photomultiplier tubes 50, 52 and 54. Mirror 44 reflects all but the blue wavelength which passes on to photomultiplier tube 50, mirror 46 reflects the red wavelength to photomultiplier tube 52, and mirror 48 redirects the green wavelength to photomultiplier tube 54.

The electrical signals 56, 58 and 60 emanating from the photomultiplier tubes 50, 52 and 54 respectively, are proportional to the reflectivity of each of the elemental areas sequentially illuminated by the scanning laser beam 24. From the photomultiplier tubes 50, 52 and 54 the individual electrical signals 56 (blue), 58 (green) and 60 (red) are electrically connected to a plurality of video amplifiers 62, 64 and 66. The amplifiers are electrically connected to a plurality of modulators 68, 70 and 72 which utilize these electric signals in conjunction with the multiple wavelength beam 74 which was split at beam splitter 26 in order to produce an output which will be registered on color film 27.

Dichroic mirrors 76, 78 and 80 direct the respective wavelengths of red, green and blue of beam 74 to the left end of modulators 68, 70 and 72 respectively.

The beam 82 emitting from the blue modulator 68 and the beams 84 and 86 emitting from the green modulator 70 and red modulator 86, respectively, are combined by mirrors 88, 90 and 92 and redirected off another face of rotating octagon 28. This beam 94 is then directed from octagon 28 to a color film which records the true color of the object being scanned.

FIG. 2 represents a schematic diagram of the multispectral laser camera 95 set up to produce a false color photograph. The multispectral laser camera 95 is substantially indentical to the camera 10 except that there is the addition of an infrared laser and the electrical connections between the photomultiplier tubes and the video amplifiers are not color coordinated. For exmaple, the red photomultiplier is electrically connected to the green video amplifier while the green is electrically connected to the blue video amplifier and the infrared wavelength is electrically connected to the red video amplifier tube.

Referring again to FIG. 2 a multiwavelength laser beam preferably in the spectral region of infrared, red, green and blue is utilized in the multispectral laser camera 95. The radiant energy source in camera 95 of this invention is a plurality of lasers 96, 98 and 100. Just as in camera 10 shown in FIG. 1 a helium neon laser 96 emits radiant energy 102 in the red spectrum while an argon laser 98 emits energy 104 in the green and blue spectrum. A dichroic mirror 106 adds the beams in order to produce the multiple wavelength laser beam 108. Beam 108 is utilized to (1) combine with an infrared laser beam 112 to form multiple wavelength beam 118 and scan an appropriate target, and (2) be redirected by bean splitter 110 to scan across the photographic color film 112 in the manner described with relationship to the camera 10 shown in FIG. 1.

Multiwavelength 108 combines with an infrared wavelength beam 112 which originates from laser source 100. The infrared beam 112 is redirected by mirror 114 and combines with beam 108 to form multiwavelength beam 118 which is directed against any suitable mirror scanner 116 in the same manner as described with reference to FIG. 1. Rotation of the mirror scanner 116 causes the multiple wavelength laser beam 118 to be scanned in the vertical plane perpendicular to the plane of the paper so as to cause successive illumination of a strip of the terrain below, which is at the intersection of the vertical plane and the ground. The reflected beams of light 120 from the target below are redirected to an optical receiving means 122. The optical receiving means 122 is identical to the optical receiving means 31 shown in FIG. 1. It is made up of a scanner mirror 124 and a plurality of other reflecting surfaces which separate the reflected energy for each wavelength in the scanning and direct the beam to separate photomultiplier tubes 126, 128, 130 and 132. The rotating scanner mirror 124 is also mechanically linked and synchronous with the first scanner mirror 116. The reflected light beams 120 are redirected from the scanner mirror 124 to a plurality of mirrors 134, 136, 140 and 142.

As the multiple wavelength beam of light leaves the reflecting surface 142, it is directed to a plurality of dichroic mirrors 144, 146, 148 and 150, where the beam is separated into the different wavelengths of light. Mirror 144 reflects the infrared wavelength to photomultiplier tube 126 while mirror 146 reflects all but the blue wavelength, which then passes on to photomultiplier tube 148. Mirror 148 reflects the red wavelength to photomultiplier tube 130 and mirror 150 reflects the green wavelength to photomultiplier tube 132.

The electrical signals 152, 154 and 156 in the case of the multispectral camera 95 are connected in a non-color coordinated manner. That is, the infrared photomultiplier tube 126 is electrically connected to the red video amplifier 158, the red photomultiplier tube 130 is electrically connected to the green video amplifier 160 and the green photomultiplier tube 132 is electrically connected to the blue video amplifier 162. The amplifiers 158, 160, 162 are then electrically connected in the same manner as set forth in FIG. 1 to the modulators 164, 166 and 168, respectively. The modulators 164, 166 and 168 utilize these electrical signals in conjunction with the multiple wavelength beam 170 emanating from the beam splitter 110 in order to produce a false color output at 169 which reflects off scanner mirror 116. The remaining operation of the multspectral camera as shown in FIG. 2 is identical with that shown in FIG. 1 and the multiwavelength beam 172 is redirected from mirror scanner 116 onto color film 112 to produce a false color of the object being scanned.

Although the invention has been described with reference to particular embodiments, it will be understood to those skilled in the art that the invention is capable of a variety of alternative embodiments within the spirit and scope of the appended claims.

We claim:

1. A multispectral laser camera comprising a plurality of lasers, a first mirror scanner optically connected to said lasers, an optical receiving means operably connected to said first mirror scanner, a plurality of photomultiplier tubes operably connected to said optical receiving means, a plurality of video amplifiers electrically connected to said plurality of photomultiplier tubes, a plurality of modulators electrically connected to said plurality of video amplifiers and optically connected to said lasers, and a film receiving means for receiving the optical signals generated by said plurality modulators.

2. A multispectral laser camera as defined in claim 1 wherein said lasers produce energy in the spectral region of red, green and blue.

3. A multispectral laser camera as defined in claim 2 wherein said optical receiving means comprises a second mirror scanner mechanically connected to said first mirror scanner and a plurality of light reflecting means.

4. A multispectral laser camera as defined in claim 3 wherein said plurality of photomultiplier tubes comprise a first photomultiplier tube which accepts energy in the blue wavelength, a second photomultiplier tube which accepts energy in the red wavelength and a third photomultiplier tube which accepts energy in the green wavelength.

5. A multispectral laser camera as defined in claim 4 wherein said plurality of video amplifiers comprise a blue video amplifier, a red video amplifier and a green video amplifier.

6. A multispectral laser camera as defined in claim 5 wherein said plurality of modulators comprise a blue modulator electrically connected to said blue video amplifier, a red modulator electrically connected to said red video amplifier and a green modulator electrically connected to said green video amplifier.

7. A multispectral laser camera as defined in claim 6 wherein said first photomultiplier tube is electrically connected to said blue amplifier, said second photomultiplier tube is electrically connected to said red amplifier and said third photomultiplier tube is electrically connected to said green amplifier.

8. A multispectral laser camera as defined in claim 6 wherein said second photomultiplier tube is electrically connected to said green amplifier and said third photomultiplier tube is connected to said blue amplifier.

9. A multispectral laser camera as defined in claim 8 wherein said lasers further produce energy in the infrared range.

10. A multispectral laser camera as defined in claim 9 wherein said plurality of photomuitiplier tubes further comprise a fourth photomultiplier tube which accepts the infrared range, said fourth photomultiplier tube being electrically connected to said red amplifier.

* * * * *